(12) United States Patent
Beland et al.

(10) Patent No.: US 9,956,900 B2
(45) Date of Patent: May 1, 2018

(54) CONNECTOR WITH INTEGRATED LIGHTING

(71) Applicant: DOMETIC SWEDEN AB, Solna (SE)

(72) Inventors: Jon Beland, Lagrange, IN (US); Dale Malott, Lagrange, IN (US); Pat McConnell, Lagrange, IN (US); Henry Swinty, Lagrange, IN (US)

(73) Assignee: Dometic Sweden AB, Solna (SE)

( * ) Notice: Subject to any disclaimer, the term of this patent is extended or adjusted under 35 U.S.C. 154(b) by 0 days. days.

(21) Appl. No.: 14/738,065

(22) Filed: Jun. 12, 2015

(65) Prior Publication Data

US 2015/0274058 A1  Oct. 1, 2015

Related U.S. Application Data

(63) Continuation of application No. 13/656,389, filed on Oct. 19, 2012, now Pat. No. 9,057,198.

(51) Int. Cl.
| | |
|---|---|
| *B60P 3/34* | (2006.01) |
| *E04F 10/06* | (2006.01) |
| *F21Y 115/10* | (2016.01) |
| *F21Y 101/00* | (2016.01) |

(52) U.S. Cl.
CPC .......... B60P 3/343 (2013.01); E04F 10/0603 (2013.01); E04F 10/0625 (2013.01); *F21Y 2101/00* (2013.01); *F21Y 2115/10* (2016.08)

(58) Field of Classification Search
CPC ....... B60P 3/343; E04F 10/0662; E04F 10/06; E04F 10/0625; E04F 10/0603; E04F 10/0666; F21V 33/006; F21Y 2101/02

USPC .......................................................... 160/127
See application file for complete search history.

(56) References Cited

U.S. PATENT DOCUMENTS

| | | | |
|---|---|---|---|
| 1,779,764 A | 10/1929 | Dasch | |
| 1,906,489 A * | 5/1933 | Sklarek | B60Q 1/245 200/332.2 |
| 5,148,849 A | 9/1992 | Faludy | |
| 5,180,223 A * | 1/1993 | McNamee | B60Q 1/305 362/223 |
| 5,601,267 A | 2/1997 | Caine | |
| 5,718,253 A * | 2/1998 | McNamee | E04H 15/08 135/88.1 |
| 5,934,349 A | 8/1999 | Faller | |
| 6,279,641 B1 | 8/2001 | Malott | |

(Continued)

FOREIGN PATENT DOCUMENTS

| | | |
|---|---|---|
| AU | 2013331123 | 3/2016 |
| CA | 2888620 | 8/2016 |

(Continued)

OTHER PUBLICATIONS

International Search Report and Writen Opinion of PCT Ser. No. PCT/US2013/065660 dated Dec. 1, 2014.

(Continued)

*Primary Examiner* — Blair M Johnson
(74) *Attorney, Agent, or Firm* — Middleton Reutlinger

(57) ABSTRACT

Embodiments of a connector with integrated lighting are provided. The connector may be used with an awning assembly of an RV, for non-limiting example. The connector includes a head and neck with a luminaire mounted thereto, and the connector may be mounted to a rail on an RV or sidewall of other structures.

17 Claims, 10 Drawing Sheets

(56) References Cited

U.S. PATENT DOCUMENTS

| | | | |
|---|---|---|---|
| 6,494,246 | B1 | 12/2002 | Blevins |
| 6,817,731 | B2 | 11/2004 | Tufte |
| 6,869,202 | B2 | 3/2005 | Tufte |
| 6,883,931 | B2 | 4/2005 | Tufte |
| 6,921,184 | B2 | 7/2005 | Tufte |
| 7,134,773 | B2 | 11/2006 | Tufte |
| D533,772 | S | 12/2006 | Heitel |
| 7,152,838 | B2 | 12/2006 | Taulbee |
| D545,182 | S | 6/2007 | Heitel |
| D549,378 | S | 8/2007 | Heitel |
| 7,401,949 | B2 | 7/2008 | Tufte |
| 7,533,679 | B2 | 5/2009 | Harbaugh |
| 7,748,675 | B2 * | 7/2010 | Nestor .................. B60P 3/36 248/273 |
| 7,871,017 | B2 | 1/2011 | Van Zutzen |
| 8,002,430 | B2 | 8/2011 | Kennedy et al. |
| 8,262,250 | B2 | 9/2012 | Li et al. |
| 9,057,198 | B2 | 6/2015 | Beland et al. |
| 9,255,441 | B2 * | 2/2016 | Shargani .................. E04H 15/58 |
| 2005/0039861 | A1 | 2/2005 | Faludy et al. |
| 2007/0211462 | A1 | 9/2007 | Dowell et al. |
| 2008/0128095 | A1 * | 6/2008 | Van Zutven ............ A01G 9/22 160/22 |
| 2008/0173341 | A1 | 7/2008 | Falin |
| 2011/0007498 | A1 | 1/2011 | Maier |
| 2012/0002409 | A1 | 1/2012 | Donauer |
| 2013/0235558 | A1 * | 9/2013 | Zhou ...................... B05B 1/202 362/96 |
| 2014/0060757 | A1 | 3/2014 | Thompson et al. |
| 2016/0236609 | A1 | 8/2016 | Beland et al. |

FOREIGN PATENT DOCUMENTS

| | | |
|---|---|---|
| EP | 2749709 | 2/2014 |
| WO | 2010004073 | 1/2010 |

OTHER PUBLICATIONS

Carefree of Colorado; Service Manual—Eclipse 2015 & on; USA; http://www.e-carefree.com/documentation/tech/052547-301r10, %20Eclipse%20Service%20Manual.pdf; Mar. 1, 2015.
Australian Divisional Patent Application No. 2016201189 entitled "Connector with Integrated Lighting" filed Feb. 25, 2016.
Australian Examiner's Report No. 1 dated May 5, 2017 for Application No. 2016201189.
Transmittal Letter of Related Cases.
IP Australia; Examination Report No. 2 for App. No. 2016201189 dated Sep. 7, 2017.

* cited by examiner

CONNECTOR WITH INTEGRATED LIGHTING

CLAIM TO PRIORITY

This continuation application claims priority to and benefit from, currently pending, U.S. patent application Ser. No. 13/656,389, titled "Awning Assembly with Integral Lighting" and having filing date Oct. 19, 2012, all of which is incorporated by reference herein.

BACKGROUND

1. Field of the Invention

Present embodiments relate to an awning for a recreational vehicle (RV), for a building or for marine use. More specifically, present embodiments are related to a connector with integrated lighting.

2. Description of the Related Art

There are various types of retractable awning assemblies that are mounted to recreational vehicles and buildings. These awnings provide a sheltered area which is shaded and provides an outdoor living space which is especially desirable for people who utilize recreational vehicles regularly and those who have outdoor patios which are highly used.

The awning assemblies typically have structures which are mounted to the wall of the RV or building structure. Awning assemblies typically have a roller assembly which is retracted when the awning is not in use and which is extended when the awning is utilized to provide a shaded, sheltered area.

In low light conditions such as at dusk or in the evenings, it may become undesirable to continue use of the sheltered area defined under and around the awning assembly because of lack of lighting. Users must typically rely on porch lights from a building or alternate lighting which may be found on an RV, such as by installing the primary lights to the awning or from within the RV by opening a door. This may be undesirable at times wherein bugs would enter the RV due to the open door.

One additional problem with providing lighting is that the awning is movable from an extended to a retracted position as previously discussed and lighting must not inhibit the extension or retraction of the awning assembly. Moreover, any electrical connections which would be needed to operate the lighting must not bind or tangle during the extension and retraction process.

Accordingly, there is need in the art for a recreational vehicle.

SUMMARY

According to some embodiments, a connector element for an awning rail assembly with integrated illumination, comprises a connector having a head which is one of hollow or solid, the connector further comprising a neck extending from the head, the head engaging an awning, the connector further comprising a luminaire mount, at least one luminaire disposed in the luminaire mount, the at least one luminaire electrically connected to a power supply. The connector may be located near an inner edge of an awning. The connector may be located spaced away from an inner edge of the awning.

According to some alternate embodiments, a retractable awning assembly with integrated illumination, comprises a retractable awning having a first inner edge, a second outer edge, a first side edge and a second side edge, an awning support structure having at least a first arm and a second arm corresponding to the first side edge and the second side edge, a roller assembly about which the retractable awning rolls, an awning rail fixedly mounted opposite the roller assembly, the rail having a retaining channel, a connector received by the retaining channel, the connector having a head disposed in the retaining channel and a neck extending from the head, a luminaire mount connected to the connector, at least one luminaire mounted to the luminaire mount, the awning engaging at least one of the connector and the awning rail. The retractable awning assembly wherein the neck may be linear. The retractable awning assembly wherein the neck is curvilinear. The retractable awning assembly wherein said luminaire mount is channel shaped. The retractable awning assembly wherein the luminaire mount further comprises at least one retaining bead. The retractable awning assembly further comprising a polyrope structure formed in the first inner edge. The retractable awning assembly wherein the first inner edge is received by the retaining channel. The retractable awning assembly wherein the luminaire is oriented at an angle to a vertical. The retractable awning assembly wherein the luminaire is oriented one of toward or away from an inner edge of the awning. The retractable awning assembly wherein the retaining channel has a semi-circular cross-section. The retractable awning assembly wherein the retaining channel has an alternative u-shaped cross-section. The retractable awning assembly wherein the connector further comprises a second retaining channel. The retractable awning assembly wherein the luminaire mount depends from the connector. The retractable awning assembly wherein the luminaire mount depends from between the head and the second retaining channel.

A retractable awning assembly with integrated illumination including a retractable awning, an awning support structure supporting sides of said awning, a roller assembly which rolls said awning into a first retracted position and a second extended position, said assembly comprises an awning rail having a first wall mount and a first retaining channel, a connector having a second retaining channel and a luminaire mount, the connector indirectly connected to the first retaining channel by the awning and spaced from the awning rail a preselected distance, a luminaire disposed in the luminaire mount. The retractable awning assembly wherein the luminaire mount comprises at least one rib for retaining the luminaire in position within the luminaire mount. The retractable awning assembly further comprising at least one wire conductor extending from the luminaire and the luminaire mount toward a switch circuit. The retractable awning assembly wherein the switch circuit is a hard switch. The retractable awning assembly wherein the switch circuit includes a remote control. The retractable awning assembly wherein the switch circuit includes both a hard switch and a remote control. The retractable awning assembly further comprising a solar collector for charging a power supply electrically connected to the luminaire.

An awning rail assembly with integrated illumination comprises an awning rail for connection to a wall, the rail having a retaining channel, a connector disposed in the retaining channel, the connector having a head which is one of hollow, solid or partially hollow, the connector further comprising a neck extending from the head, the head one of capturing an awning in the retaining channel or receivably retaining said awning, the connector further comprising a luminaire mount, at least one luminaire disposed in the luminaire mount, the at least one luminaire electrically connected to a power supply. The awning rail assembly wherein the connector is spaced from the awning rail. The awning rail assembly wherein the luminaire is disposed in at least one orientation. The awning rail assembly further comprising a power switch electrically connected to the luminaire. The awning rail assembly wherein the luminaire is an LED strip. The awning rail assembly wherein the LED strip is a plurality of connected strips. The awning rail assembly further comprises a power supply. The awning rail assembly further comprises at least one conductor wire extending from an end of the luminaire mount. The awning rail assembly further comprising a wire cover at an end of the luminaire mount. The awning rail assembly wherein the connector is adjustable about a horizontal axis to adjust the luminaire mount position. The awning rail assembly wherein the luminaire mount includes a plurality of parallel luminaires. The awning rail assembly wherein the plurality of parallel luminaires are oriented in same direction. The awning rail assembly wherein the plurality of parallel luminaires are oriented in different directions. The awning rail assembly further comprising at least one cap disposed on the luminaire mount. The awning rail assembly wherein the at least one cap is one of translucent, semi-translucent or opaque.

An awning assembly with integrated lighting, comprises an awning assembly having an awning material with an inner edge, an outer edge and first and second side edges, a roller housing which receives the awning material and about which the awning material wraps, the roller housing being generally cylindrical in shape and having end caps at axial ends of the housing, a slot extending longitudinally through the roller housing, a luminaire engaging the slot and providing illumination under the awning assembly when the awning assembly is in an extended position. The awning assembly wherein the luminaire is positioned in the slot. The awning assembly further comprising a connector disposed in the slot. The awning assembly wherein said luminaire is positioned in a luminaire mount of the connector. The awning assembly further comprising a cap near ends of the luminaire mount. The awning assembly further comprising a lens disposed over the luminaire within the luminaire. The awning assembly further comprising wiring disposed in the slot for powering the luminaire. The awning assembly wherein the wiring one of routes into said roller housing or extends exterior to said roller housing to an end of said slot. The awning assembly wherein the light is directed downward and toward a sidewall. The awning assembly wherein the light is directed downward and away from a sidewall.

An awning assembly with integrated lighting comprises a roller assembly connected to an awning and rollable from a first retracted position to a second extended position, the roller assembly including a housing and at least one end cap, an accessory slot extending along the housing and end cap in a longitudinal direction, the accessory slot receiving one of the luminaire or a connector having the luminaire.

An awning assembly comprising an awning having a first side edge an opposed second side edge, a first inner edge and a second outer edge, a pocket formed of a transparent material between the first inner edge and the second outer edge, a luminaire disposed in the pocket, at least one wire extending to a hem formed in the awning and toward the inner edge of the awning. The awning assembly wherein the pocket extends parallel to the outer edge. The awning assembly wherein the pocket extends perpendicular to the outer edge. The awning assembly wherein the pocket extends at an angle between the side edges.

BRIEF DESCRIPTION OF THE DRAWINGS

In order that the embodiments may be better understood, embodiments of the awning with integral lighting will now be described by way of examples. These embodiments are not to limit the scope of the claims as other embodiments of the awning with integral lighting will become apparent to one having ordinary skill in the art upon reading the instant description. Non-limiting examples of the present embodiments are shown in figures wherein:

DETAILED DESCRIPTION

Figure 1:
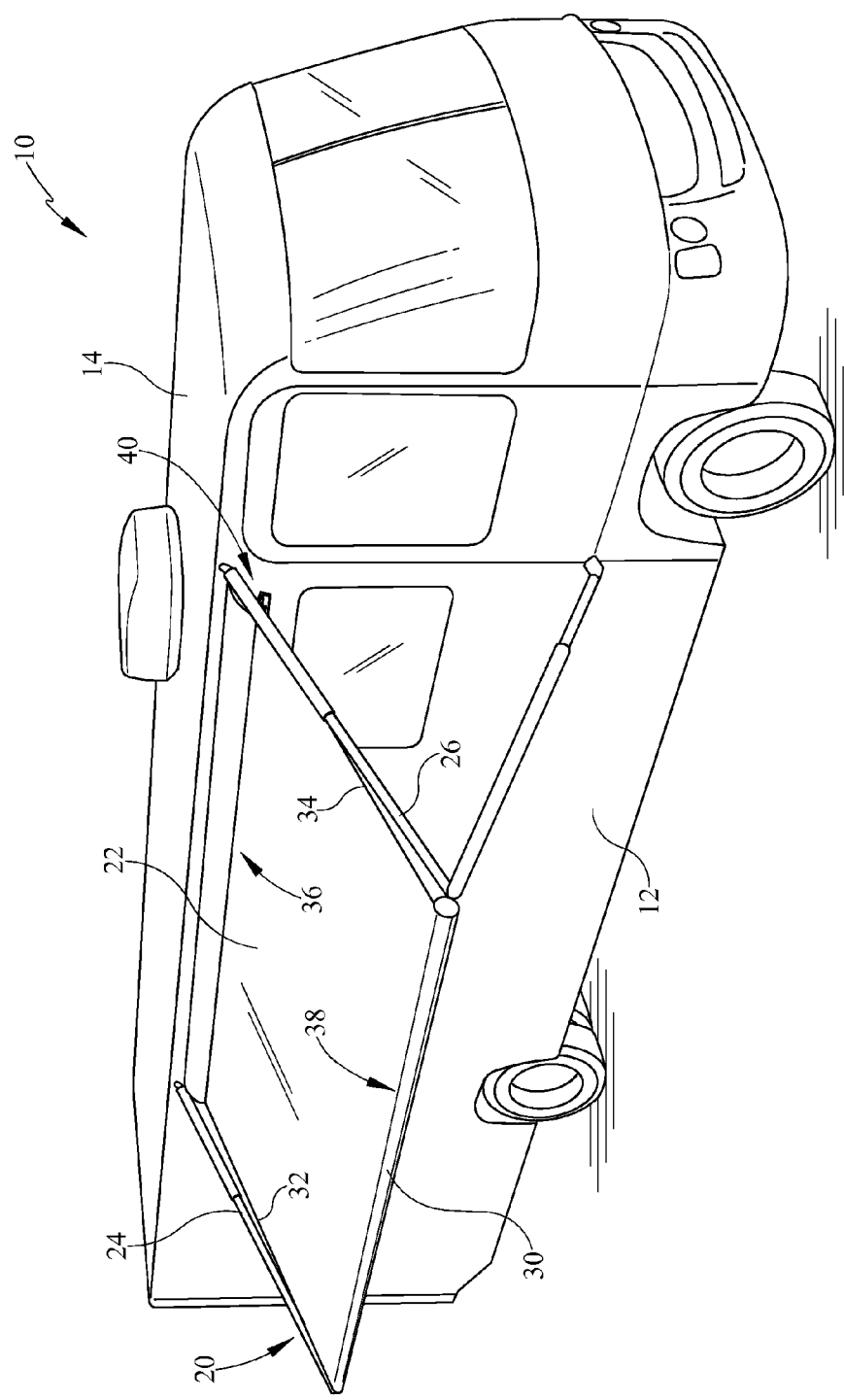
FIG. 1 is a perspective view of one possible exemplary embodiment of an awning assembly.

It is to be understood that the awning assembly with integral lighting is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numeral indicate like elements throughout several views, there are shown in FIGS. 1 through 12 various embodiments of awning assemblies which include an integrated lighting on the awning assembly. The assembly is retractable or extendable despite the luminaire.

Referring now to FIG. 1, a perspective view of a recreational vehicle 10 is depicted. The RV includes a drive and transmission, not shown, as well as a sidewall 12 and a roof 14. An awning assembly 20 is connected to one of the sidewall 12 or the roof 14 of the vehicle 10. In further embodiments, the awning assembly 20 may be retractable within the sidewall so as to reduce the airflow interference of the assembly while the vehicle 10 is being operated.

The awning assembly 20 includes an awning or canopy 22, at least one first arm 24 and at least one second arm 26. The awning or canopy 22 includes a first side edge 32, a second side edge 34, a first inner edge 36 and a second outer edge 38. The awning 22 is exemplary and other variations may be utilized. The assembly 20 further includes a roller assembly 30 which moves inwardly and outwardly with corresponding retraction or extension of the awning 22 to provide the sheltered or shaded area beneath the awning assembly 20. The roller assembly 30 may be a manual assembly requiring manual rotation to extend or retract the canopy 22. Alternatively the roller assembly 30 may be an automated system such as by electrical, air, hydraulic or other fluid power systems to cause extension or retraction of the canopy 22. The awning assembly 20 further comprises an awning rail assembly 40 which is utilized according to the instant embodiment to connect the awning assembly 20 to the sidewall 12 of the vehicle.

It should be understood that although an RV is referred to in the exemplary embodiments, one skilled in the art should understand that the use of the awning with lighting is not limited to these vehicles. The awnings may be used with homes other stationary structures as well as boats or other marine application for example which use canopy structures which may or may not be retractable commercial vehicles, agricultural vehicles, horse trailers, and temporary structures such as those used at sports events, (tailgating) and flea markets.

Figure 2:
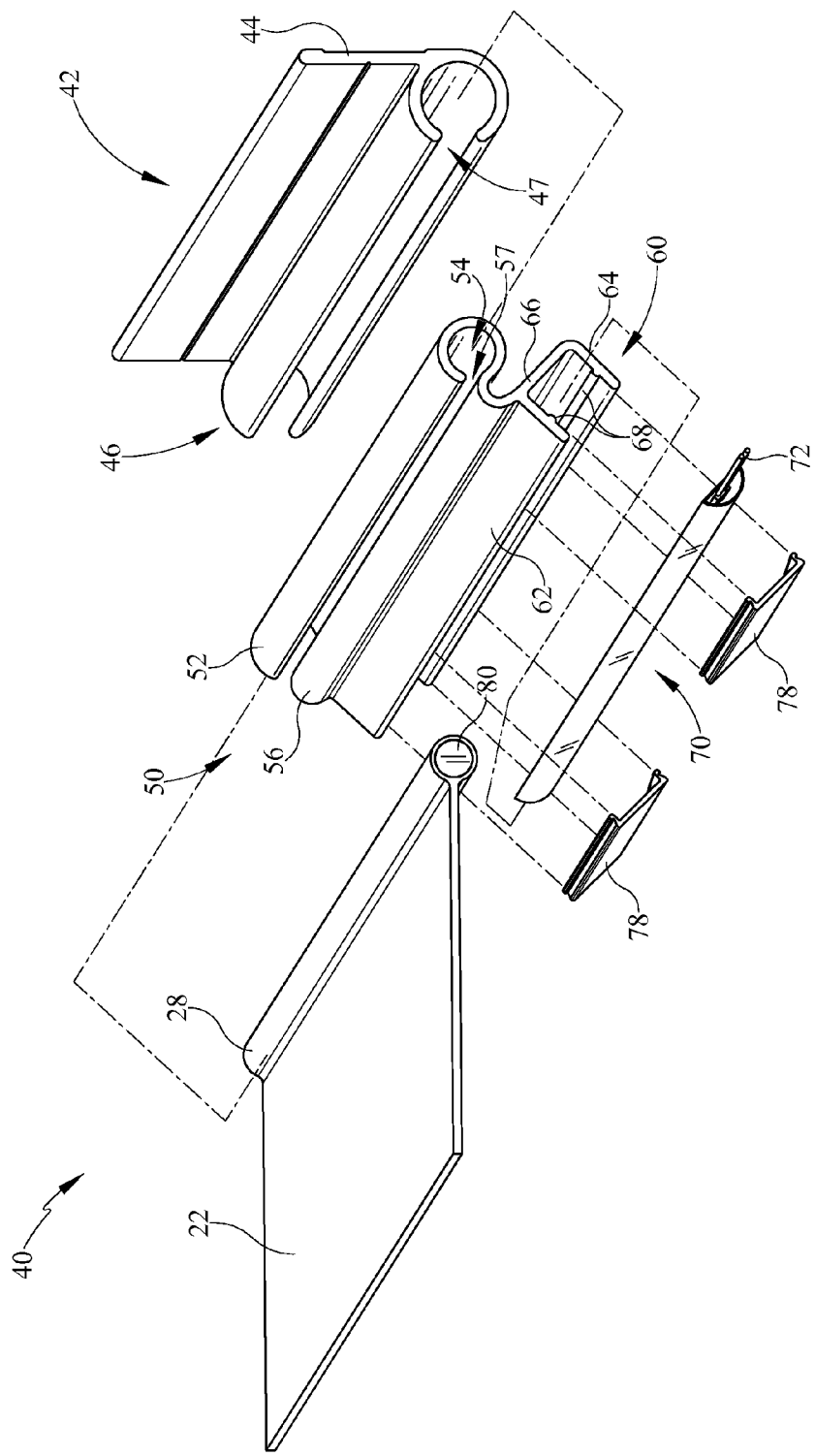
FIG. 2 is an exploded perspective view of one embodiment of an awning rail assembly with integrated lighting.

Referring now to FIG. 2, an exploded perspective view of a portion of an exemplary awning rail assembly 40 is depicted. An awning rail 42 is positioned against a structural or RV sidewall 12 (FIG. 1). The awning rail 42 includes an upstanding wall or wall mount 44 and a retaining channel 46 connected thereto. Alternatively, the mount 44 may be directed downwardly or alternatively the channel 46 may be located at various positions thereon. As a further alternative, the mount wall 44 may be curved or other shapes other than linear. A variety of awning rail shapes are known in the art and well within the scope of the present disclosure. The wall mount 44 may be fastened to the sidewall 12 of the RV or building by fasteners, suction devices, or adhesive or any combination thereof. The retaining channel 46 is generally circular in shape with a relief opening 47 which allows the awning 22 to extend therefrom upon assembly. The retaining channel 46 while circular in the exemplary embodiment may be various alternate shapes such as a U-shaped channel, square with the relief opening 47 or other polygonal shape.

According to some embodiments, a connector 50 may be positioned within the retaining channel 46 or according to other embodiments the awning 22 may be captured within the retaining channel by the connector 50. The instant embodiment utilizes a connector 50 which is positioned within the retaining channel 46. The connector 50 includes a head 52 and a neck 56 extending from the head 52. The connector 50 may be formed in an extrusion process, for example, for ease of manufacture. The extrusion or connector 50 may be rigid or soft. For example, if a rigid extrusion is desired, the material may be, for example, PVC Polypropylene or other polymeric with ultraviolet and embrittlement resistant characteristics. Alternatively, for example, a flexible extrusion 50 may be desired made of santoprene or other soft extruding materials. These are non-limiting examples as other materials may be used by one skilled in the art. The head 52 is generally circular in shape corresponding in size to the retaining channel 46 so that the head 52 may be positioned therein. The head 52 may be solid or hollow. According to the exemplary embodiment, the head 52 is hollow defining an opening 54. The head 52 has a first terminating end and extends circularly to adjacent the first end. The neck 56 is curvilinear continues extending from the head 52 such that the curvilinear shape of the neck 56 passes by the first terminating end of the head 52, forming a gap or relief opening 57 therebetween.

The neck 56 extends to a luminaire mount 60 which has a first sidewall 62 and a second opposed sidewall 64. A joining wall 66 connects ends of the walls 62, 64 defining the luminaire mount 60. The wall 64 is connected to the neck 56 to form the connector 50. The first and second walls 62, 64 have at least one retaining bead 68. In the exemplary embodiment, two opposite beads 68 are utilized to retain a luminaire strip 70. The luminaire strip may be formed of a plurality of light emitting diodes (LEDs) and is electrically connected to a circuit 90 (FIG. 11) by at least one wire 72. The LED strip 70 may vary in length depending on the desired length of illumination. The LED strip 70 may be a water proof, water resistant or a standard LED which may be used with or without a lens to inhibit weather contaminants from negatively affecting operation of the LED strip 70. The strip 70 is retained within the mount 60 toward the wall 66 by retaining beads 68. Although this design is depicted, alternate methods of retaining the luminaire 70 may be utilized and the exemplary embodiment should not be considered limiting. Alternatively, the luminaire strip 70 may be adhered to the luminaire mount 60 with adhesives or fixatives rather than requiring use of the beads 68. Additionally, for example, one or more pairs of retaining beads 68 may be utilized to retain caps or lens structures 78 on the luminaire mounts 60. One pair may be used to retain a luminaire strip 70 in place while a second pair of beads 68 may be utilized to retain a cap 78. Alternatively, a single pair of opposed beads 68 may retain both the LED strip 70 and the cap or lens 78 in position. As alluded to above, the caps 78 may be a variety of lengths and may be translucent, semi-translucent or opaque. The caps 78 include at least one leg which engages beads 68 to retain the cap on the extrusion or connector 50. These caps 78 may or may not be used with all of the embodiments shown and described herein.

The luminaire mount 60 is oriented at an angle to the vertical. When installed, the mount is at an angle to the vertical and may be adjusted by rotation of the connector 50 within the retaining channel 46 as described further herein. Such rotation may be limited by the awning and by the neck 56 engagement with the lower portion of the retaining channel 46. Alternatively, the luminaire mount 60 may be fixed relative to the awning rail and as a further addition may be directed horizontally or vertically downward to provide lighting under the awning assembly 20 (FIG. 1).

The awning 22 is captured within the opening 54 of the head 52. The awning 22 is sewn or otherwise formed to have a pocket at a first inner end, in the instant embodiment. The pocket 28 may be formed by folding an end of the awning over and forming a loop or pocket 28. The loop or pocket structure 28 is retained by sewing or otherwise connecting the awning to itself. Within the pocket 28 is a polyrope structure 80 which fills the pocket 28 and has a diameter size to fit within the opening 54 of the connector 50. The pocket 28, including the polyrope 80 is slidably positioned through the connector 50 so that awning 22 extends from the relief opening 57. The diameter of the polyrope 80 is formed to be greater than the size of the relief opening 57, inhibiting removal of the polyrope 80 and awning pocket 28 except by axial sliding motion. For example, the polyrope 80 is about (¼") one-quarter inch in diameter but may be within an exemplary and non-limiting range of ⅛ to about 5/16 inch and more preferably, for non-limiting example, 3/16 to about 1/4 inch. The polyrope may be formed of butyl-rubber, rope or other flexible materials.

Figure 3:
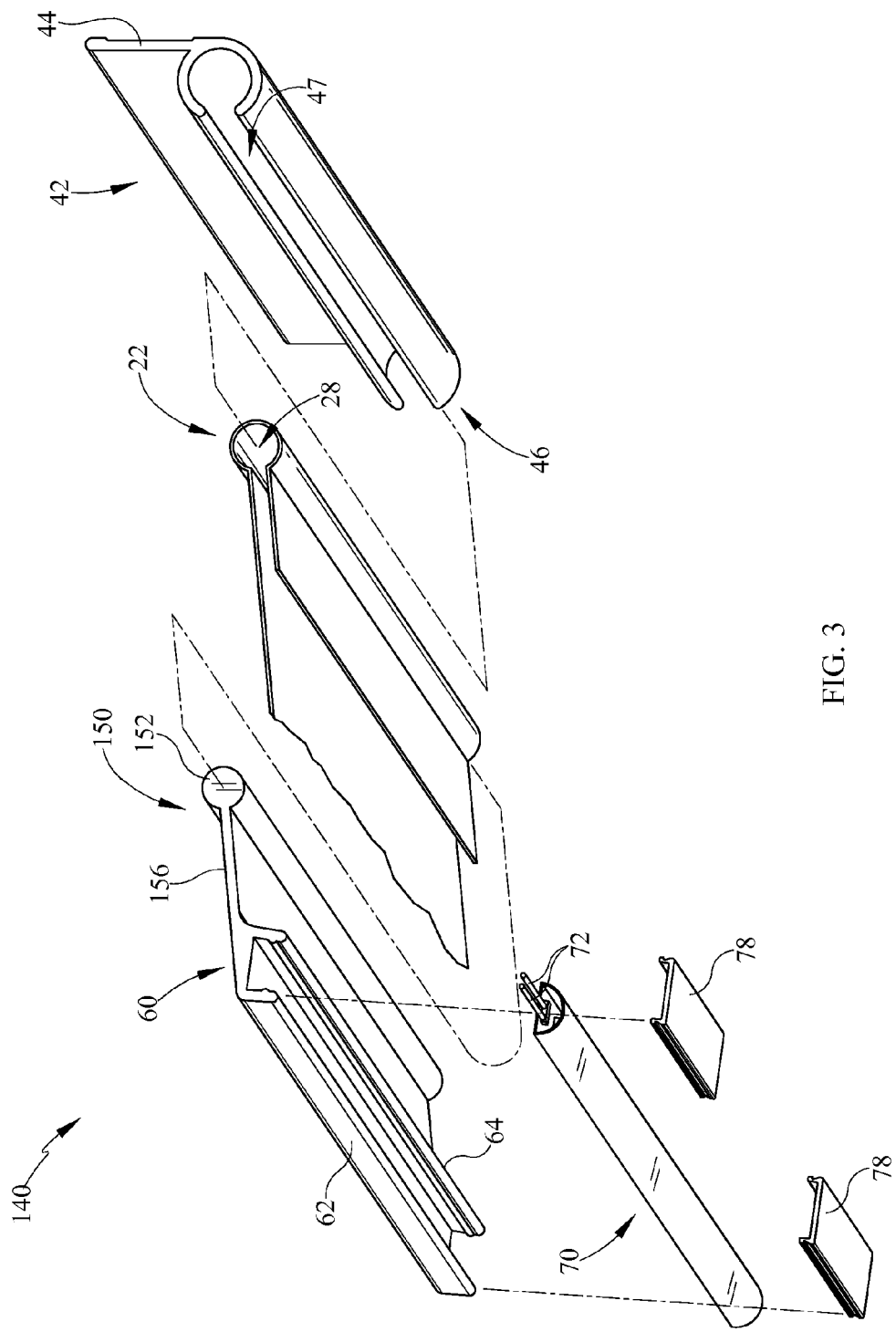
FIG. 3 is an exploded perspective view of a second embodiment of an awning rail assembly with integrated lighting.

Referring now to FIG. 3, an alternate embodiment of the awning rail assembly 140 is depicted wherein an awning rail 42 is provided. Similar to the prior embodiment, the awning rail 42 includes retaining channel 46 and a wall mount 44. The relief opening 47 is defined between ends of the retaining channel 46 which is generally circular in cross-section except for the relief 47. Adjacent to the awning rail 42 is the awning 22. The awning has a pocket 28 as defined by looping the inner end of the awning 22 back to attach upon itself. The pocket 28, as depicted in the FIG. 3 may or may not be sewn or affixed together so as to receive a connector 150.

According to this second embodiment, the connector 150 includes a head 152 and a neck 156 which extends linearly from the head 152. The head 152 is formed with a solid material so that the entire connector may be extruded during manufacture. Other manufacturing methods may be utilized however. The head 152 is received within the pocket 28 of the awning 22. These may or may not be sewn or affixed together through the neck 156. These pieces are slidably received within the retaining channel 46 and extend from the awning rail 42 through the relief opening 47. The head 152 is circular in shape and of a size to fit within the retaining channel 46 while further having the awning pocket 28 formed around the head 152.

A luminaire mount 60 extends from the neck 156 and has a three wall design as with the previous embodiment. The luminaire mount 60 may take a variety of forms however and therefore the exemplary embodiment is not limiting. The luminaire 70 is exploded from the mount 60 but as with previous embodiments may be mounted between the walls 62, 64. According to the current embodiment, the luminaire 70 is directed downwardly so as to provide direct lighting.

According to an alternate embodiment of FIG. 3, the connector 150 may be spaced from the rail 42. For example, the connector 150 may be sewn into the awning 22 some distance from the rail 42 rather than received by the rail channel 46. Such manner is discussed below and shown in FIG. 4. Any of the embodiments of the connectors described within this disclosure may be sewn directly into the awning 22 or may be connected to the awning by way of a polyrope or other rope like materials which is sewn into the awning 22.

Figure 4:
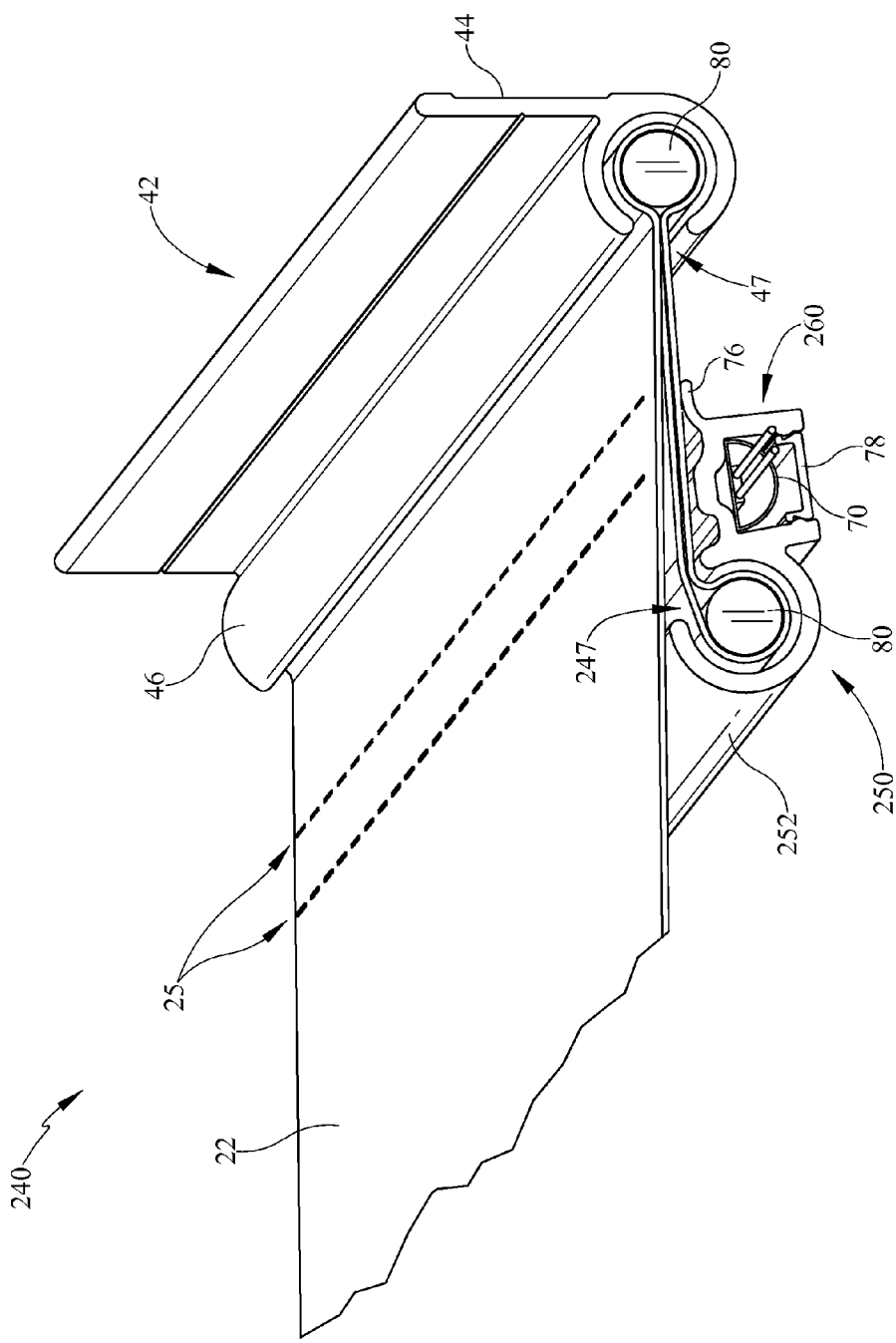
FIG. 4 is a perspective assembly view of a third embodiment of an awning rail assembly with integrated lighting.

Referring now to FIG. 4 an assembled perspective view of a further alternative embodiment is depicted. According to this embodiment, the connector 250 is spaced from the awning rail 42 and merely connected by way of awning material stretched between the awning rail 42 and connector 250. As described in previous embodiments, the awning rail 42 includes a wall mount 44 and retaining channel 46. Again, the retaining channel 46 of the exemplary embodiment is generally circular in cross-section however alternate shapes may be utilized, for example pentagonal, hexagonal or octagonal.

A polyrope structure 80 captures a portion of the awning 22 within the retaining channel 46. According to one embodiment, the awning 22 may be wrapped around the polyrope 80 and the combined rope 80 and awning material 22 slidably positioned through the relief opening 47 of the retaining channel 46. Since the rope 80 and awning 22 combination have a larger diameter than the relief opening 47, the awning 22 and rope 80 are captured within the retaining channel 46. Further portions of the awning 22 extend from the first retaining channel 46 to the connector 250. The connector 250 includes a retaining channel 252 which receives the awning 22 and a polyrope 80. As with the first retaining channel 46, the combination of polyrope 80 and awning 22 have a diameter greater than the distance of a relief opening 247 in the connector 250. Thus the rope 80 and awning 22 are retained in the second channel 252. Depending from the second retaining channel 252 is a luminaire mount 260. Alternatively, this hollow second retaining channel may be considered a head with a neck joining the luminaire mount 260. This embodiment is similar to those of the previous figures and receives luminaire 70. According to the instant embodiment, the mount may direct luminaire strip 70 toward the RV as shown, or away from the RV as in previous embodiments. Optionally, a positioning leg 76 may be formed on the connector 250 by extrusion in order to direct the light in various directions. Such positioning leg 76 may be formed in a variety of manners and may or may not be used with any of the connectors depicted in the disclosure in order to provide an additional means of directing light. As with previous embodiments, this may be a luminaire strip formed of LEDs for example. At least one stitch or hem 25 is located between the awning rail 42 and the connector 250. This stitch 25 inhibits the connector from hanging loosely below the upper portion of the awning 22. Alternatively, the awning may be affixed with adhesive or welding rather than the at least one stitch depicted.

Figure 5:
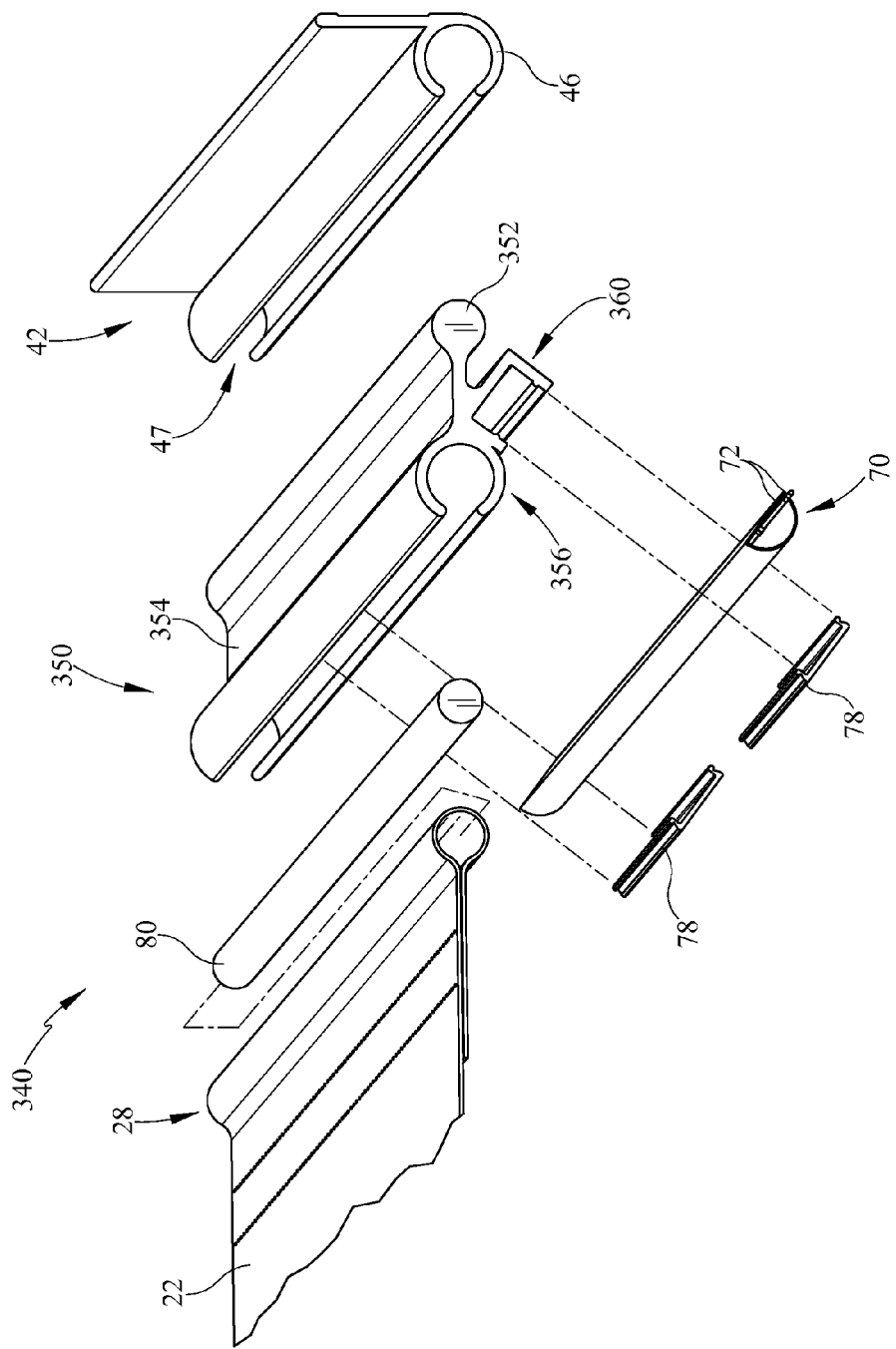
FIG. 5 is an exploded perspective view of a fourth embodiment of an awning rail assembly with integrated lighting.

Referring now to FIG. 5, a still further embodiment of the awning rail assembly 340. An awning rail 42 is configured at one end of the depicted assembly. The awning rail 42 is similar to those recently described. A connector 350 includes a head 352, a neck 354 and a second retaining channel 356. The connector 350 may be an extruded structure and further includes a luminaire mount 360. The head 352 is a solid material and is circular in cross-section to be received within the correspondingly shaped retaining channel 46. The extrusion or connector 350 may be formed of a single piece of material as previously described or may be formed of two or more materials in a co-extrusion process. For example, the head 352 and neck 354 may be formed of polyrope or butyl material. Additionally, the second retaining channel 356 may be formed of a more rigid material such as PVC, polypropylene or other polymeric with ultraviolet and embrittlement characteristics. However, these are non-limiting examples. As with previous embodiments the diameter of the head 352 is greater than the dimension of the relief opening 47 so that the connector 350 is retained within the channel. The neck 354 extends linearly from the head 352 to the second retaining channel 356 which is also circular in shape. The polyrope material 80 is again utilized within a pocket 28 of the awning 22 such that the combination of the polyrope and awning pocket 28 may be slidably received within the retaining channel 356.

Figure 6:
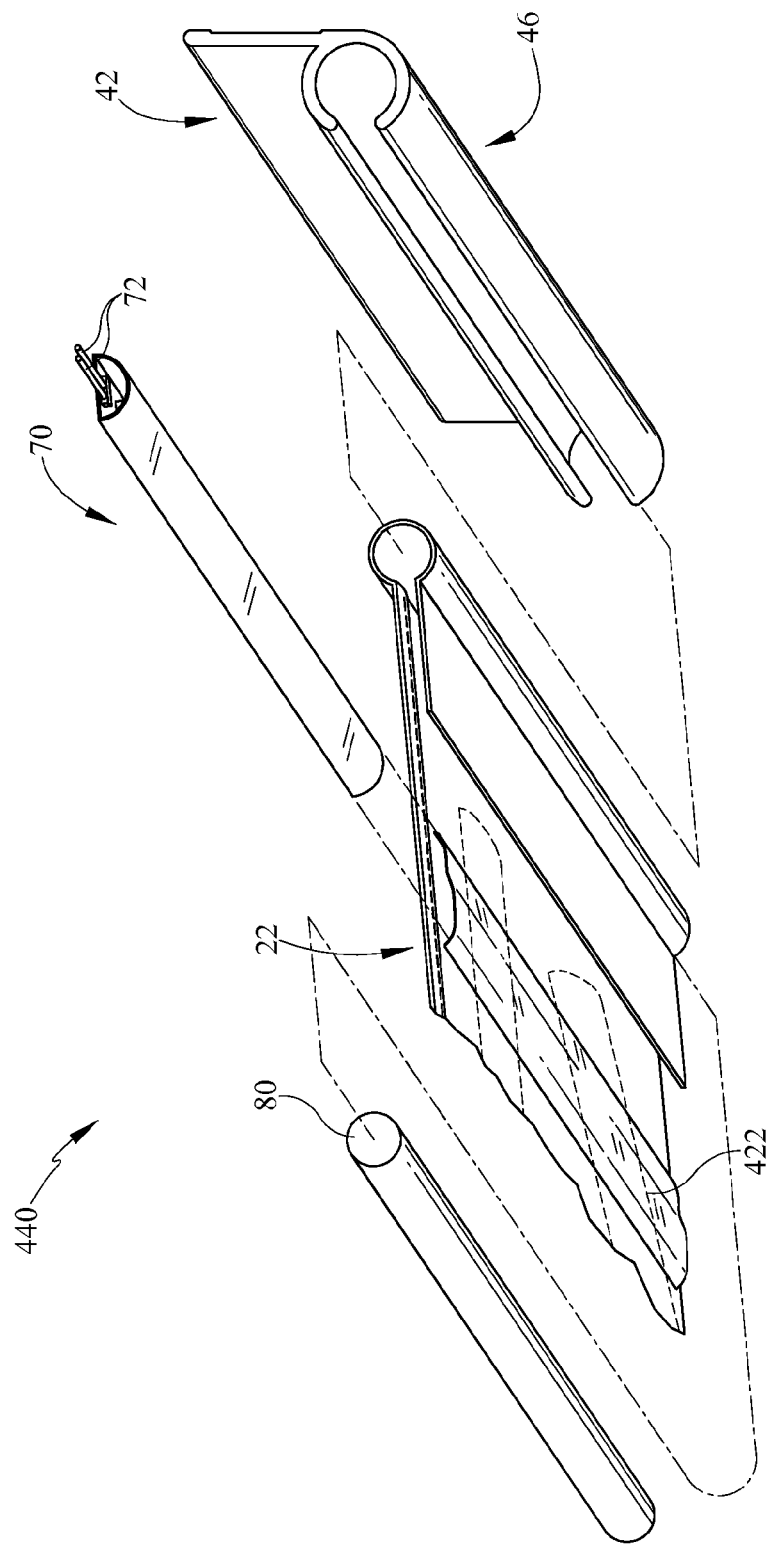
FIG. 6 is an exploded perspective view of an alternate awning embodiment with a pocket for receiving a luminaire.

Referring now to FIG. 6, a further alternative embodiment of the awning rail assembly 440 is depicted. The awning rail assembly 440 includes an awning rail 42 similar to the previously described embodiments. Adjacent to the awning rail 42 is an awning 22 which may receive a polyrope 80 so that the polyrope is fitted within the awning 22 in order to capture or retain the awning within the retaining channel 46 of the awning rail 42. As with the previous embodiments, a relief opening 47 is utilized in the retaining channel 46 to allow the awning 22 to extend from the awning rail 42. Although the instant embodiment depicts the use of the polyrope 80 to capture the awning 22 within the awning rail 42, alternative embodiments may be utilized such as the connector structures described previously which may also capture or retain the awning 22 within the retaining channel 46.

The awning 22 of the instant embodiment further comprises a pocket 422. The pocket 422 extends between a first-side edge and a second-side edge of the awning 22 and may or may not extend the full width of the awning 22 depending on the length of light strip 70 utilized. The pocket 422 may be formed of a transparent material which is sewn or otherwise affixed to the awning 22 and does not hinder roll-up of the awning 22 from the extended to the retracted position. The pocket 422 allows for insertion of the light strip 70 there thru. The wiring for the light strip may extend from the pocket end and through a side wall to which the awning rail 42 is connected.

In one embodiment, the pocket 422 is located closely to the rail awning 42 so that the wiring need only run a short distance to a side wall of an RV or building to which the awning is connected. Thus the problems associated with running wiring thru a hem of an awning is alleviated and also problems associated with roll-up of the wiring are also alleviated. However, such embodiment is not limiting as the pocket 422 and light strip 70 may be moved to various locations between the inner and outer ends of the awning 22.

It should also be understood that alternate embodiments may orient the pocket 422 in manners other than that which is shown. For example, the pocket 422 may be oriented in a plurality of manners. As shown, the pocket 422 extends between first and second sides of the awning. However, alternate lengths may be utilized. Further, alternate orientations may be used such that the pocket 422 may extend between inner and outer ends and further at angles therebetween as shown in broken lines.

Additionally, according to this embodiment, a method of moving wire for powering the light strip 70 is shown. For example, the wire may be located within a hem along side edges of the awning 22.

Figure 7:
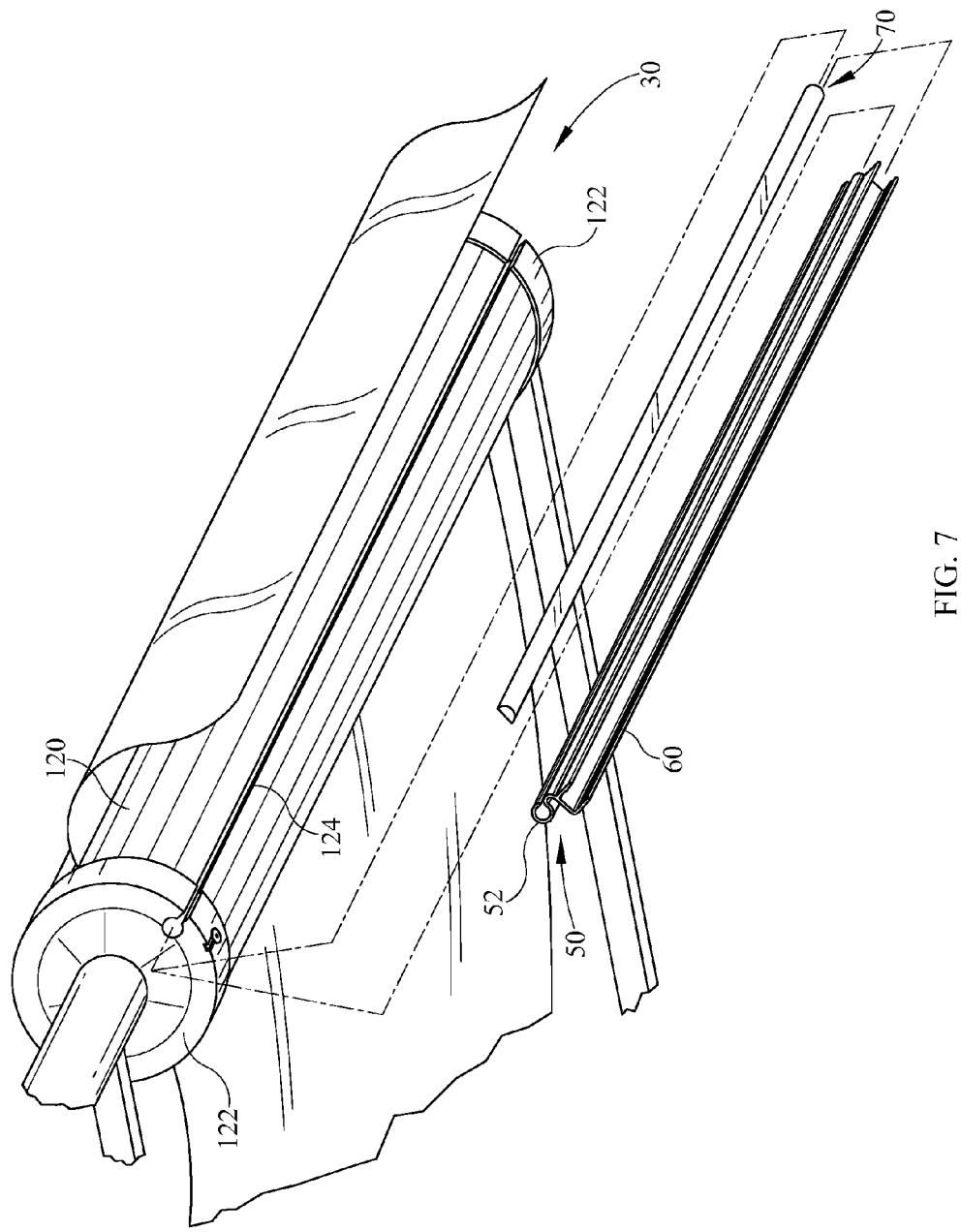
FIG. 7 is a perspective end view of a roller assembly having accessory slots to integrate various lighting embodiments.

Referring now to FIG. 7, an alternative embodiment is depicted in perspective view. A roller assembly 30 is utilized with the awning assembly 20 to extend or retract the awning material 22. As previously indicated, this may be done manually or automatically through use of a motor. The roller assembly 30 includes a roller housing 120 and an end cap 122. A slot 124 extends in an axial direction of the roller housing 120 and through the end cap 122. The accessory slot allows positioning of a luminaire strip 70 and wiring to power and control the luminaire strip 70 without interfering with the awning or canopy material 22 when the structure is rolled during retraction or extension. The wiring may extend fully through the slot and through the end cap externally or may be routed along the slot to a suitable position for further routing into the roller and elsewhere through the awning assembly components.

As a further embodiment, depicted in the figure, a connector (for example FIG. 5) may be positioned within the slot 124. The connector and such embodiment would likely be extruded of a soft material to allow positioning through the slot 124. The luminaire 70 would then be positioned in the luminaire mount 60. In such construction, caps or lenses 78 could be utilized with the luminaire mount 60. It should be understood by one skilled in the art that any of the connectors depicted in the embodiment described herein might be utilized with the roller housing 120.

Figure 8:
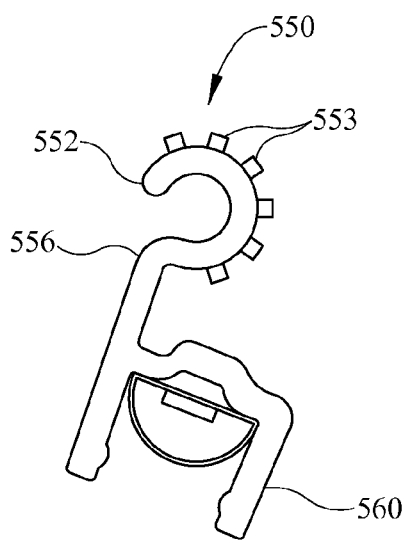
FIG. 8 is a side view of an alternate connector with adjustment for the luminaire position.
Figure 9:
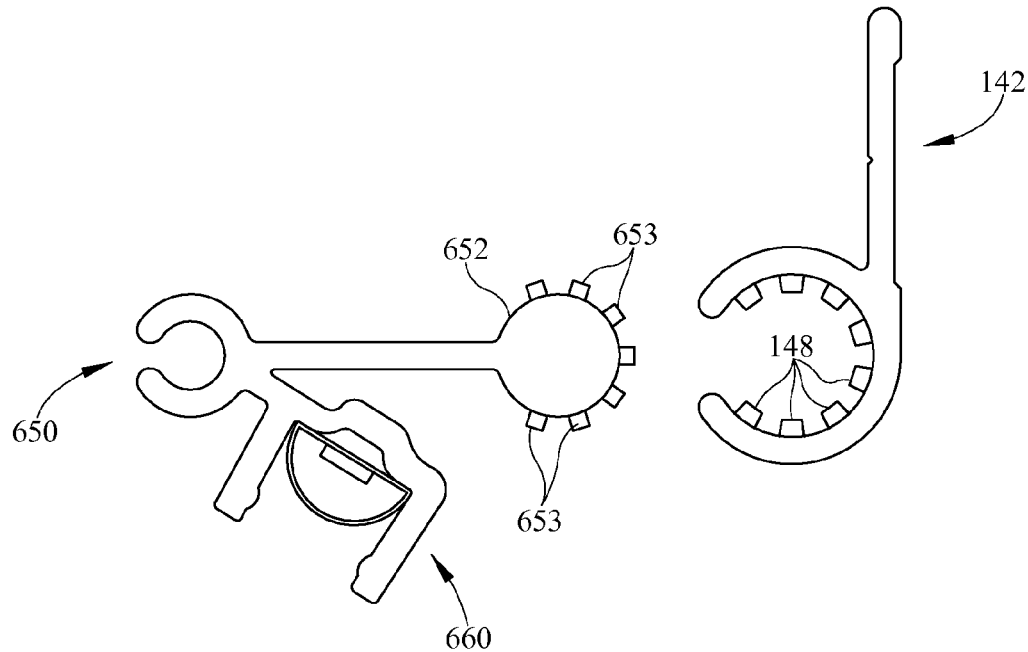
FIG. 9 is a side view of a further alternative connector and awning rail to adjust the luminaire position.

Referring now to FIG. 8, an alternative embodiment of a connector 550 is depicted. The connector 550 includes a head 552 and a neck 556 which extend to a luminaire mount 560. The head 552 includes a plurality of ribs or teeth 553. The ribs or teeth 553 may be utilized to engage corresponding ribs or teeth 148 located in a retaining channel of an alternative awning rail 142 (FIG. 9). This would allow for rotation of the connector 550 into different positions relative to opposing teeth 148 (FIG. 9) so that the luminaire mount 560 may be aimed to various positions. Alternatively, rather than teeth or ribs, an interference fit may be made between the connector and the retaining channel and may be adjustably rotated until a desirable light path is found wherein friction retains the luminaire mount at the desired position.

With reference now to FIG. 9, a further alternative connector 650 is shown having a head 652 including a plurality of teeth 653. As with the previous embodiment, these teeth or ribs may engage teeth 148 at various positions so as to retain the connector at a desired location to aim the luminaire mount 660. Thus, the various connectors previously discussed may be utilized with teeth or ribs for adjustment to various angular positions.

Figure 10:
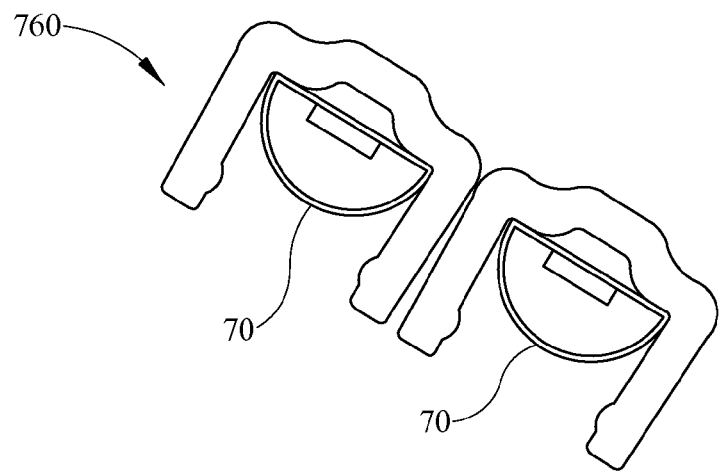
FIG. 10 is a side view of an alternative luminaire mount.

Referring now to FIG. 10, an alternate embodiment is depicted having a luminaire mount 760 including structures to allow parallel mounting of light strips 70. The parallel mounts 760 may form two or more rows of luminaire strips 70. The strips 70 may be aligned in the vertical direction or they may be offset from one another in the vertical direction along the width direction of the awning 22.

Figure 11:
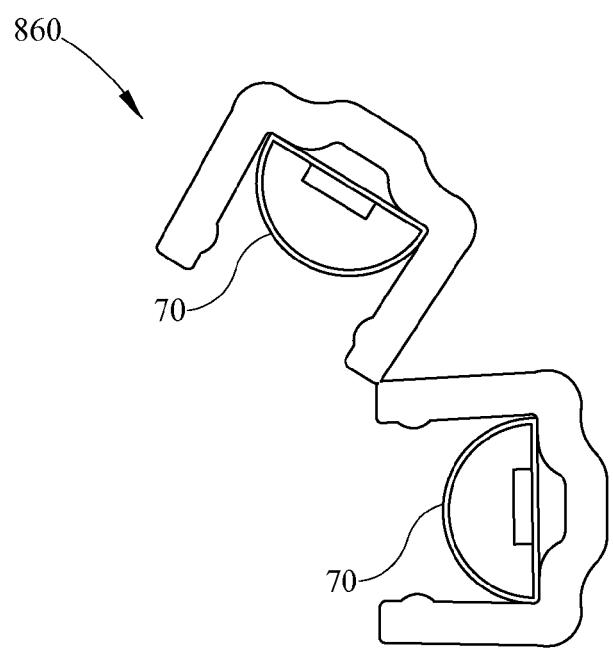
FIG. 11 is a side view of a further alternative luminaire mount.

Additionally, and with reference now to FIG. 11, an alternative luminaire mount 860 is depicted where the two or more rows are offset angularly so as to provide lighting in different directions as opposed to that shown in FIG. 10. The lighting 70 may be directed downwardly or upwardly or both so as to provide direct lighting in a downward direction and upward to provide indirect reflective lighting from the awning under-surface. As a further alternative, any of the previously described luminaire mounts may also be directed upwardly to illuminate the under-surface of the awning or in a reverse direction from that which is depicted so as to illuminate the side wall of the RV or building and provide indirect lighting for the area in such a manner.

Figure 12:
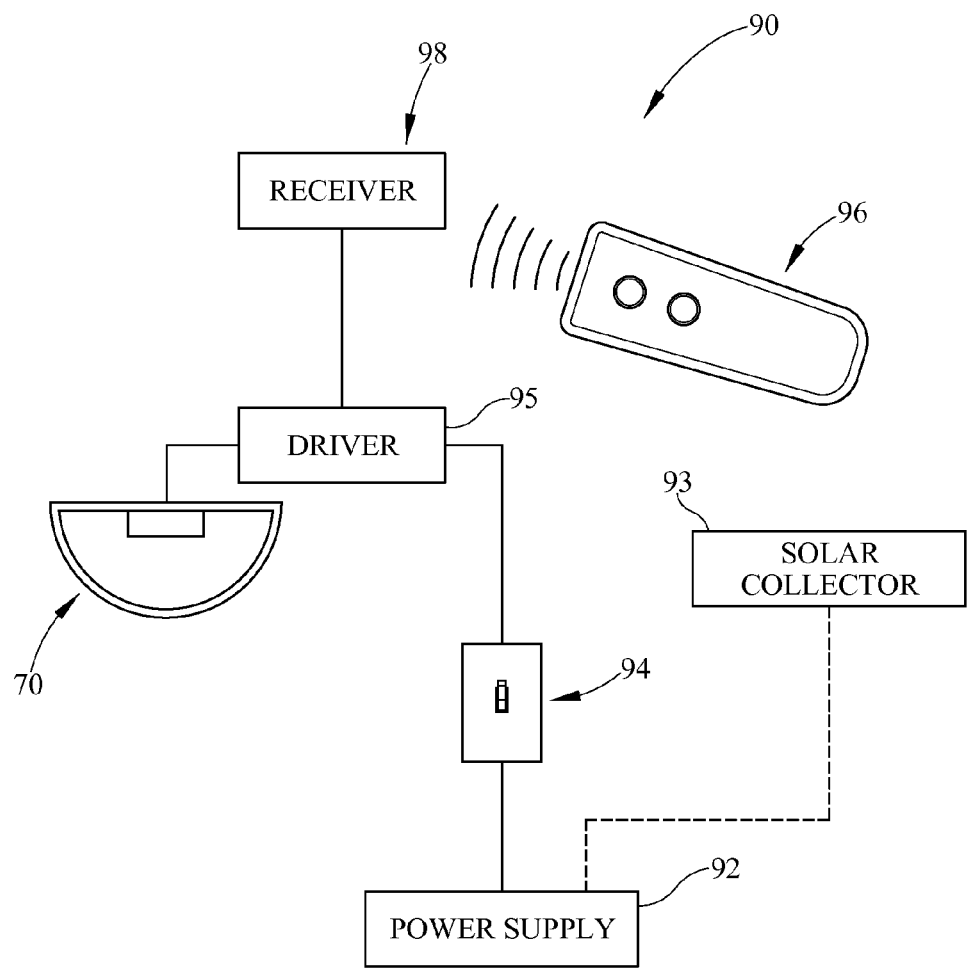
FIG. 12 is a schematic view of a circuit for use with the awning lights.

Referring now to FIG. 12, a schematic view of an exemplary circuit 90 for powering the device is shown. A power supply 92 is shown which may be a battery which is connected for charging to an RV engine. Alternatively, the power supply 92 may be typical 120V supply which is used in many homes and buildings or may be a low voltage, such as 12V, DC source typical in homes and RVs. The power supply 92 is electrically connected to a switch 94 which is manually operated to power on and power off the luminaire 70. Additionally or as an alternative to the switch 94, the circuit 90 may include a remote operation for powering the light 70. According to such embodiment, a remote 96 is shown for wireless communication with a receiver 98. The remote may communicate by RF, infrared, Bluetooth or other known wireless communication standards. Disposed between the switch 94 and the receiver 98 is a driver 95 which may provide various functionality of the LED luminaire 70. The driver 95 may vary providing fixed illumination, dimming functionality of the LED 70 or vary the color of the light bar 70 or some combination of these functions.

Referring still to FIG. 12, a solar collector 93 may additionally be utilized with the circuit 90. The solar collector 93 is shown in connection with the power supply 92, for example to charge one or more batteries in the RV, building, or marine vehicle. The solar collector 93 is an optional embodiment and therefore is not required for use as previously described but could be used to provide a self-sufficient system for powering the luminaire 70.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

"Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and an embodiment of the invention has been presented for purposes of illustration. It is not intended to be exhaustive or to limit the invention to the precise steps and/or forms disclosed, and obviously many modifications and variations are possible in light of the above teaching. It is intended that the scope of the invention and all equivalents be defined by the claims appended hereto.

The invention claimed is:

1. A connector for lighting, comprising:
   a head which is one of hollow or solid, said connector further comprising a neck extending from said head;
   a fixed rail having a retaining channel, said fixed rail having a non-circular cross-section;
   said head capable of connection to said fixed rail which receives said head;
   said connector further comprising a luminaire mount;
   at least one luminaire disposed in said luminaire mount, said at least one luminaire electrically connected to a power supply;
   said head capable of operably engaging an awning canopy and wherein said head may be connected to said fixed rail in both retracted and extended positions of said awning canopy.

2. The connector of claim 1, said connector being connected to said fixed rail.

3. The connector of claim 2, said head having a shape which is received by an opening of the fixed rail.

4. The connector of claim 1, said neck being linear.

5. The connector of claim 1, said neck being curved.

6. The connector of claim 1, further comprising retaining beads within said luminaire mount.

7. The connector of claim 1, further comprising a lens positioned over said luminaire mount.

8. The connector of claim 1, further comprising a retaining channel connected to said neck.

9. The connector of claim 8, said luminaire mount depending from at least one of said neck and said retaining channel.

10. The connector of claim 1, said head having a plurality of teeth for adjusting position of said connector.

11. The connector of claim 1, said rail having an opening including a plurality of teeth for adjustment of positioning of said connector therein.

12. A connector for light on a recreational vehicle, comprising:
    a fixed rail having a retaining channel;
    a connector having a head, said head being one of hollow or solid and capable of being received by said channel of said fixed rail;
    a neck extending from said head;
    a luminaire mount extending from said connector, said luminaire mount including an opening allowing light to output from said luminaire mount;
    at least one luminaire disposed in said luminaire mount, said at least one luminaire connected to a power source;
    said connector and said fixed rail being non-circular in cross-section;
    said fixed rail retaining said connector and said connector engaging an awning canopy when said awning canopy is retracted and extended.

13. The connector of claim 12, said luminaire being a light emitting diode.

14. The connector of claim 12, said head having a circular cross-section.

15. The connector of claim 12, said head having a cross-sectional shape corresponding to said cross-section of said retaining channel of said rail.

16. A connector assembly for lighting, comprising:
    a fixed awning rail having a mount and a retaining channel;
    a head which engages said retaining channel;
    a neck extending from said head and a luminaire mount connected to said neck;
    an LED luminaire disposed in said mount;
    said head being adjustable about an axis of said retaining channel.

17. The connector assembly of claim 16, further comprising a second retaining channel connected to said neck.

\* \* \* \* \*